(12) United States Patent
McBride et al.

(10) Patent No.: US 11,580,344 B2
(45) Date of Patent: Feb. 14, 2023

(54) AUTHENTICATION APPARATUS, SYSTEM AND METHODS USING UNCLONABLE IDENTIFIERS

(71) Applicant: SRI International, Menlo Park, CA (US)

(72) Inventors: Sterling E. McBride, Princeton, NJ (US); Michael G. Kane, Princeton, NJ (US); Alex Krasner, Princeton, NJ (US); Richard Sita, Audubon, NJ (US); Winston K. Chan, Princeton, NJ (US); Mark F. Schutzer, Redwood City, CA (US)

(73) Assignee: SRI International, Menlo Park, CA (US)

( * ) Notice: Subject to any disclaimer, the term of this patent is extended or adjusted under 35 U.S.C. 154(b) by 408 days.

(21) Appl. No.: 16/497,098

(22) PCT Filed: Mar. 27, 2018

(86) PCT No.: PCT/US2018/024526
§ 371 (c)(1),
(2) Date: Sep. 24, 2019

(87) PCT Pub. No.: WO2018/183296
PCT Pub. Date: Oct. 4, 2018

(65) Prior Publication Data
US 2021/0158121 A1 May 27, 2021

Related U.S. Application Data

(63) Continuation-in-part of application No. 15/542,469, filed as application No. PCT/US2016/012339 on Jan. 6, 2016, now Pat. No. 10,664,625.
(Continued)

(51) Int. Cl.
*G06F 13/42* (2006.01)
*G06K 19/07* (2006.01)
(Continued)

(52) U.S. Cl.
CPC ....... *G06K 19/0723* (2013.01); *G06K 19/073* (2013.01); *G06K 19/077* (2013.01);
(Continued)

(58) Field of Classification Search
CPC .......... G06K 19/0723; G06K 9/00577; G06K 19/073; G06K 19/077; H04L 9/0869; H04L 9/3226; H04L 9/3278; H04L 2209/805
(Continued)

(56) References Cited

U.S. PATENT DOCUMENTS 7,015,823 B1 3/2006 Gillen et al.
7,188,258 B1 3/2007 Aggarwal et al.
(Continued)

FOREIGN PATENT DOCUMENTS

JP 5-343492 A 12/1993

OTHER PUBLICATIONS

International Search Report and Written Opinion, PCT/US2018/024526, ISA:US, dated Jun. 14, 2018, 21 pp.

*Primary Examiner* — Zhen Y Wu
(74) *Attorney, Agent, or Firm* — Rutan and Tucker, LLP

(57) ABSTRACT

An integrated circuit having Radio Frequency Identification components and circuitry used for authentication is discussed. The RFID components and circuitry include two or more coils and corresponding electrical circuits that are tuned to use two or more different resonant frequencies including: a first resonant RF used for power generation and a second resonant RF used for data communication. The integrated circuit contains a unique signature that is used for
(Continued)

the authentication with two or more aspects including i) a first aspect that is a programmed password in a memory embedded on the integrated circuit, and ii) a second aspect that is a unique, randomly generated code based upon a physical characteristic of the integrated circuit.

15 Claims, 9 Drawing Sheets

Related U.S. Application Data

(60) Provisional application No. 62/477,898, filed on Mar. 28, 2017, provisional application No. 62/101,398, filed on Jan. 9, 2015.

(51) Int. Cl.
| | |
|---|---|
| G06K 19/073 | (2006.01) |
| G06K 19/077 | (2006.01) |
| H04L 9/08 | (2006.01) |
| H04L 9/32 | (2006.01) |
| G06V 20/80 | (2022.01) |

(52) U.S. Cl.
CPC ............ G06V 20/80 (2022.01); H04L 9/0869 (2013.01); H04L 9/3226 (2013.01); H04L 9/3278 (2013.01); H04L 2209/805 (2013.01)

(58) Field of Classification Search
USPC ........................................................ 340/1.1
See application file for complete search history.

(56) References Cited

U.S. PATENT DOCUMENTS

| | | | |
|---|---|---|---|
| 8,681,000 B2* | 3/2014 | August | A01K 11/004 340/853.2 |
| 2004/0212544 A1 | 10/2004 | Pennaz et al. | |
| 2005/0156318 A1 | 7/2005 | Douglas | |
| 2005/0247779 A1* | 11/2005 | Ohkubo | G06K 7/10346 235/383 |
| 2006/0066453 A1 | 3/2006 | Homanfar et al. | |
| 2007/0236336 A1 | 10/2007 | Borcherding | |
| 2009/0009295 A1* | 1/2009 | Rofougaran | H04B 5/0012 340/10.1 |
| 2009/0051491 A1 | 2/2009 | Lu et al. | |
| 2010/0047564 A1 | 2/2010 | Kim et al. | |
| 2010/0256976 A1 | 7/2010 | Atsmon et al. | |
| 2010/0315153 A1 | 12/2010 | Oksanen et al. | |
| 2011/0127953 A1 | 2/2011 | Walley et al. | |
| 2011/0127844 A1* | 6/2011 | Walley | H02J 50/12 307/104 |
| 2011/0127845 A1* | 6/2011 | Walley | H02J 50/70 307/104 |
| 2011/0169657 A1* | 7/2011 | August | G06Q 10/087 340/854.6 |
| 2011/0309904 A1* | 12/2011 | Aoki | G06K 19/07794 29/601 |
| 2012/0001701 A1 | 1/2012 | Taniguchi et al. | |
| 2013/0207786 A1* | 8/2013 | Hutzler | G06K 19/0718 340/10.51 |
| 2013/0232587 A1 | 9/2013 | Boday et al. | |
| 2013/0265142 A1* | 10/2013 | Jones | G06K 17/0025 340/10.6 |
| 2014/0042627 A1 | 2/2014 | Edelstein et al. | |
| 2014/0231518 A1* | 8/2014 | Yosui | G06K 19/07794 235/492 |
| 2015/0041616 A1* | 2/2015 | Gentile | A47F 5/00 248/550 |
| 2015/0324681 A1* | 11/2015 | Mats | G06K 19/07766 235/492 |
| 2016/0034728 A1* | 2/2016 | Oliver | H04L 9/0833 340/10.1 |
| 2016/0092706 A1* | 3/2016 | Deyle | H04B 5/0031 340/10.1 |
| 2016/0203348 A1 | 7/2016 | Narendra | |
| 2017/0262862 A1* | 9/2017 | Aljawhari | G06F 16/242 |
| 2017/0288736 A1* | 10/2017 | Zhou | H01Q 1/248 |
| 2018/0276420 A1 | 9/2018 | Kane | |

* cited by examiner

AUTHENTICATION APPARATUS, SYSTEM AND METHODS USING UNCLONABLE IDENTIFIERS

CROSS-REFERENCE

This application is a 35 U.S.C. § 371 U.S. National Stage of International Patent Application No. PCT/US2018/024526, titled "AUTHENTICATION APPARATUS, SYSTEM AND METHODS USING UNCLONABLE IDENTIFIERS," having an International Filing Date of Mar. 27, 2018 which claims priority under 35 USC 119 to U.S. provisional patent application SN 62/477,898, titled "Authentication apparatus, system and methods using unclonable identifiers," Filed: 28 Mar. 2017, and this application claims priority to and the benefit under 35 USC 121 as a continuation-in-part of U.S. Non-Provisional Patent Application No. 15/542,469, filed Jul. 10, 2017, titled "Unclonable RFID Chip and Method," which claims priority to and the benefit of PCT patent application PCT/US16/12339, "Unclonable RFID chip and method," filed Jan. 6, 2016, which claimed priority to U.S. provisional patent application SN 62/101,398, filed Jan 9, 2015, where all of these disclosures are incorporated herein by reference in their entirety.

GOVERNMENT RIGHTS

This invention was made with government support under contract number HR0011-15-C-0010 awarded by the Defense Advanced Research Projects Agency (DARPA). The government has certain rights in the invention.

TECHNICAL FIELD

Embodiments of this disclosure relate generally to integrated circuits, such as application-specific integrated circuits (ASICs). More specifically, an embodiment relates to ultra-miniature ASIC devices, systems, and methods.

SUMMARY

Provided herein can be various methods, apparatuses, and systems for an integrated circuit. In an embodiment, an integrated circuit has Radio Frequency Identification components and circuitry used for authentication. The RFID components and circuitry include two or more coils and corresponding electrical circuits that are tuned to use two or more different resonant frequencies including: 1) a first resonant RF used for power generation and 2) a second resonant RF used for data communication. The integrated circuit contains a unique signature that is used for the authentication with two or more aspects including i) a first aspect that is a programmed password in a memory embedded on the integrated circuit, and ii) a second aspect that is a unique, randomly generated code based upon a physical characteristic of the integrated circuit.

DRAWINGS

Figure 8:
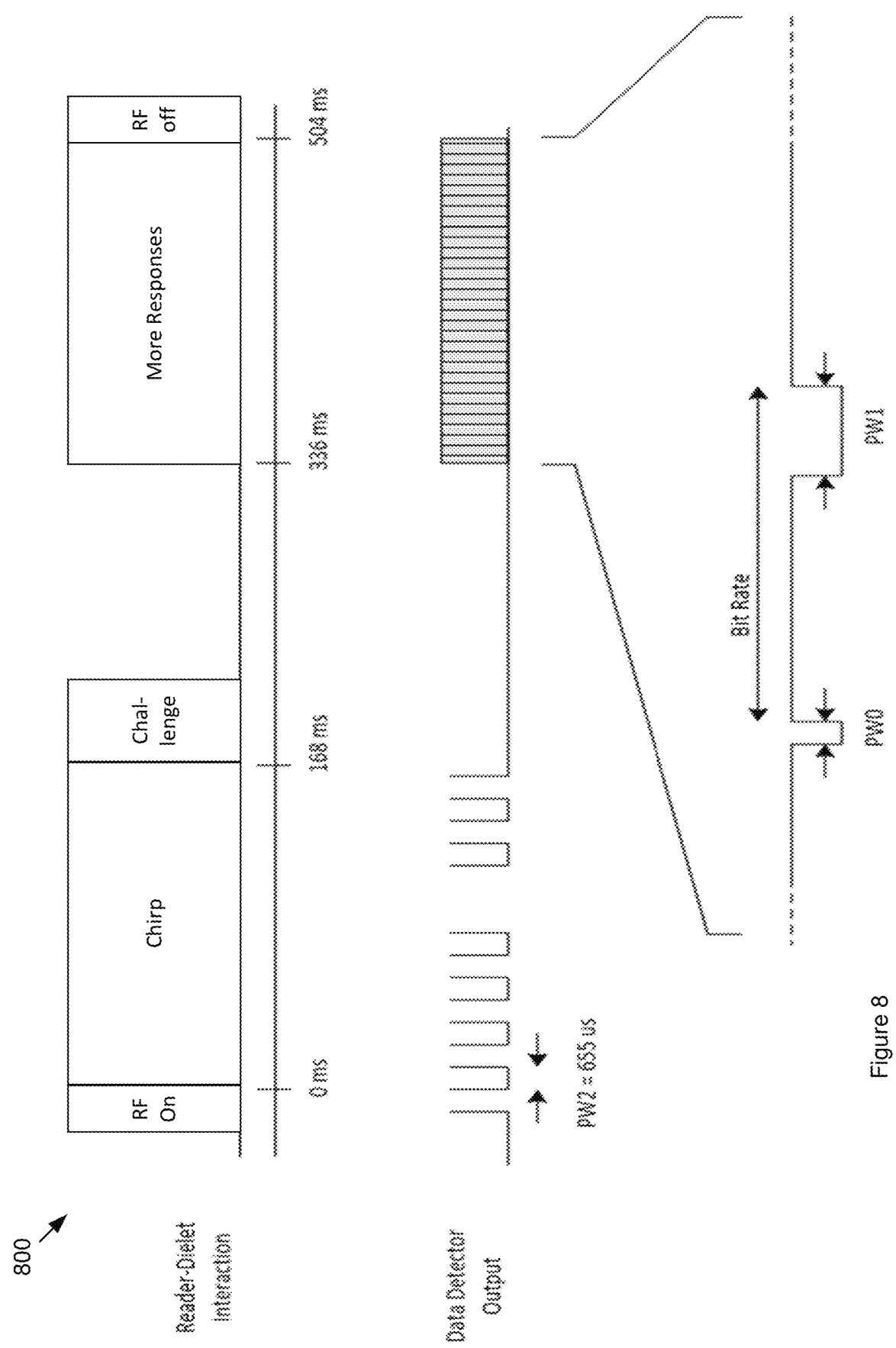
Figure 9:
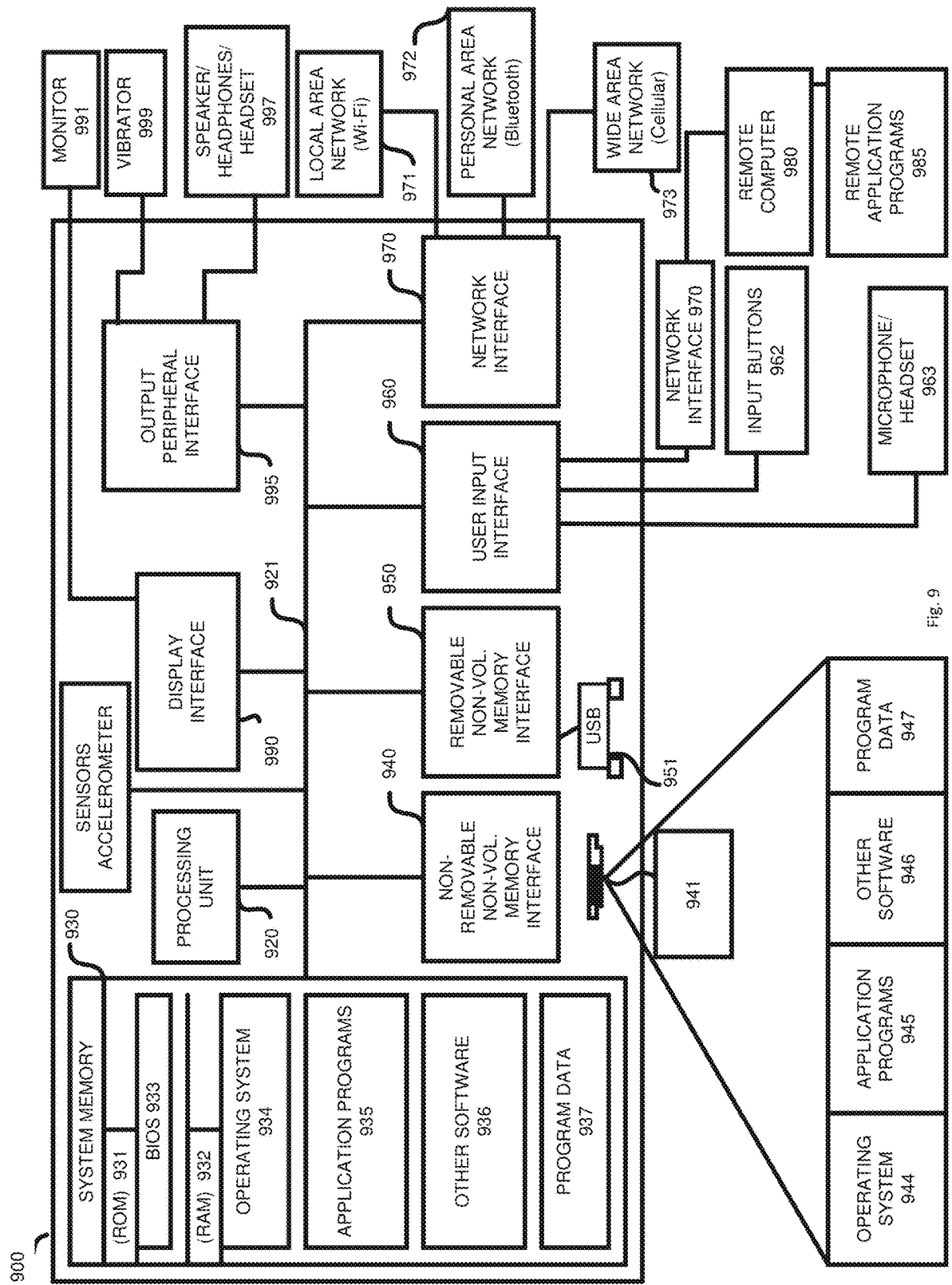

FIG. 8 illustrates an example diagram of the external RF reader sampling the one or more modulated chirps and applying statistical analysis to the sampled data to determine what constitutes a logical 1 and a logical 0 from the fabricated and singulated integrated circuit; and FIG. 9 illustrates an embodiment of one or more computing devices that can be a part of the systems associated with the integrated circuit discussed herein.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of frames, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first server, can be made. However, the specific numeric reference should not be interpreted as a literal sequential order but rather interpreted that the first server is different than a second server. Thus, the specific details set forth can be merely exemplary. The specific details can be varied from and still be contemplated to be within the spirit and scope of the present design. The term "coupled" is defined as meaning connected either directly to the component or indirectly to the component through another component.

Description of an Authentication System

Figure 1:
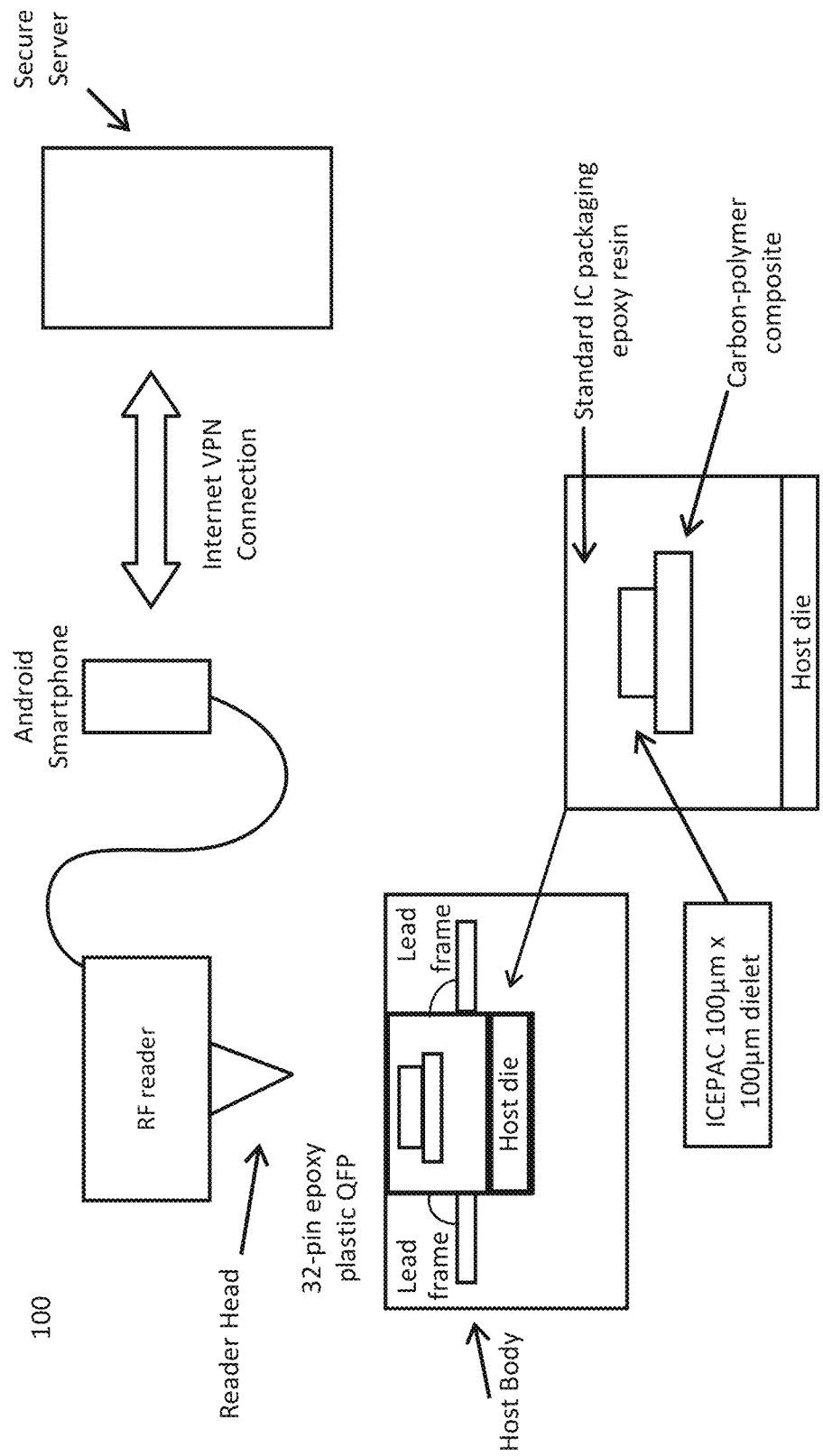
FIG. 1 illustrates a diagram of an embodiment of a configuration of a system that utilizes an integrated circuit configured with an unclonable identifier.

FIG. 1 illustrates a diagram of an embodiment of a configuration of a system that utilizes an integrated circuit configured with an unclonable identifier. The integrated circuit may have Radio Frequency Identification components and circuitry used for authentication. The RFID components and circuitry include two or more coils and corresponding electrical circuits that are tuned to use two different resonant frequencies. FIG. 1 illustrates a configuration of an example overall system 100 that utilizes an integrated circuit.

In FIG. 1, the integrated circuit is shown coupled to another IC. The integrated circuit sends one or multiple pieces of unique information for the unclonable identifier that provide evidence that the host body it is coupled to, is authentic, and that the host body has not experienced a tampering event to replace with a counterfeit host body. The information is obtained from the integrated circuit through the use of a querying system such as an RF reader. Several configurations of the RF reader may be utilized. In the configuration illustrated in FIG. 1, the reader may interface with a smartphone (or other electronic device), which may host a computer application (e.g. software or firmware) that enables the smartphone to communicate with the RF reader.

The integrated circuit contains a unique signature for the unclonable identifier that is used for the authentication with two or more aspects. The two or more aspects include i) a first aspect that is a programmed password in a memory embedded on the integrated circuit, and ii) a second aspect that is a unique, randomly generated code based upon a physical characteristic of the integrated circuit. The unique randomly generated code based upon the physical characteristic of the integrated circuit can be an amount of resistance between pads for a sensor that depends on an amount of carbon present in a composite between the pads for that particular integrated circuit.

The RF reader may receive or collect the unique information from the integrated circuit when commanded by the application. This unique information may be collected by the application and then sent over to a server where the uniqueness of the information may be verified. The server may then send a message back to the smartphone relaying the status of presented information (i.e., to verify the uniqueness). An operator, such as a human operator or automated system, may read the message and determine whether the object the integrated circuit is coupled to is authentic or not and has not been altered since initial integrated circuit assembly with the host unit.

The secure server implements the algorithms and a database for checking the unique signature of the integrated circuit/die that contains the unique aspect of the voltage and/or resistance measurement indicative of the resistance value. A sensor is configured to measure the physical characteristic of the integrated circuit. A second resonant circuit on the integrated circuit is tuned to use the second resonant RF for data communication to convey at least some of the signature information to a first coil of an associated RF reader. The associated RF reader, in addition to reading the programmed code in the memory, also reads the unique randomly generated code based upon the physical characteristic, and these two aspects of the unique signature are then configured to be sent over a network to a server and associated database of unique signatures for different integrated circuits in order to be verified for its authenticity.

The security server, the RF reader, or both may be configured to use a fuzzy logic algorithm to initially register a value indicative of the amount of resistance for each different integrated circuit. The fuzzy logic algorithm has both i) a range of acceptable values that will match the signature of that integrated circuit and ii) will also make accommodations for a change in the amount of resistance of that integrated circuit overtime; and thus, change in the second aspect of the unique signature. For example, the RF Reader will update the resistance/voltage enrollment value associated with a specific RF chip overtime. Overtime, the stored values for the resistance will be updated; and in that way, the window of what is an acceptable range of matching signatures for the unclonable ID will change overtime as the device ages.

Note, typically the RF reader will make a voltage measurement with putting the resistance of the unclonable RF chip in some ratio with another resistor in order to make a voltage measurement of the value of the uncomfortable resistance measurement. When a voltage and measurement is made then that measurement in value will be insensitive to temperature changes because both resistors will be changing value based on different temperatures but the ratios will be linear; and thus, the voltage measurement will be a constant. The integrated circuits internal resistance between the pads may degrade overtime and change its resistance value.

In one embodiment, the integrated circuit is tiny (e.g. 100 micrometers by 100 micrometers by 10 micrometers thick) and configured to send information that is unique to the integrated circuit when queried by a querying system. The tiny integrated circuit may be coupled to an object, such as but not limited to, another integrated circuit (IC), a paper or non-paper based physical currency, a consumer good, or an industrial good. Consumer goods may include but are not be limited to luxury items such as expensive handbags, expensive wine bottles, high-end electronic devices such as smartphones and wearable devices, etc. Industrial goods include vehicles, machinery and equipment. In general, the object or item to which the integrated circuit is coupled may be referred to herein as a "host body." The host body may comprise a physical object, device or system, or an individual component or subsystem of the physical object, device, or system. For example, the host body may be an item that is portable, movable, self-propelled, easily reproduced or counterfeited, or which is at risk of being misplaced, lost, stolen, tampered with, misused, or misidentified.

Note, merely the RF reader associated with the integrated circuit/die can read the unique code. It cannot be directly read externally. It cannot be reverse engineered as any dismantling will destroy the code. The sensor interface that reads the code requires very little semiconductor area on the die, and easily scales to more advanced semiconductor technologies. No external power is required to maintain the code or its security.

Once the die/integrated circuit is attached to the host body, a security system, such as the example one shown in FIG. 1 can verify and authenticate the host body using the unique signature. As shown in FIG. 1, an RF probe can be attached to a mobile device, such as a smart phone, or a tablet computer. The mobile device can then communicate in a secure manner across a cellular or Internet connection, possibly through a VPN, with the security server. The security server maintains the list of codes and the associated components to allow them to be validated.

In an embodiment, the integrated circuit is an electronic RFID tag that is configured to physically couple with a separate product. The electronic RFID tag is suitable for authenticating a provenance of the physically coupled separate product, via communicating to an associated RF reader, via the electronic circuitry using the second resonant RF used for data communication and the first resonant RF used for supplying power to the RFID tag. The unique signature of the RFID tag is verified via a database of unique signatures.

The design of this system includes many aspects that provide beneficial features. Some of these aspects will now be described in more detail.

Description of the Integrated Circuit

Figure 2:
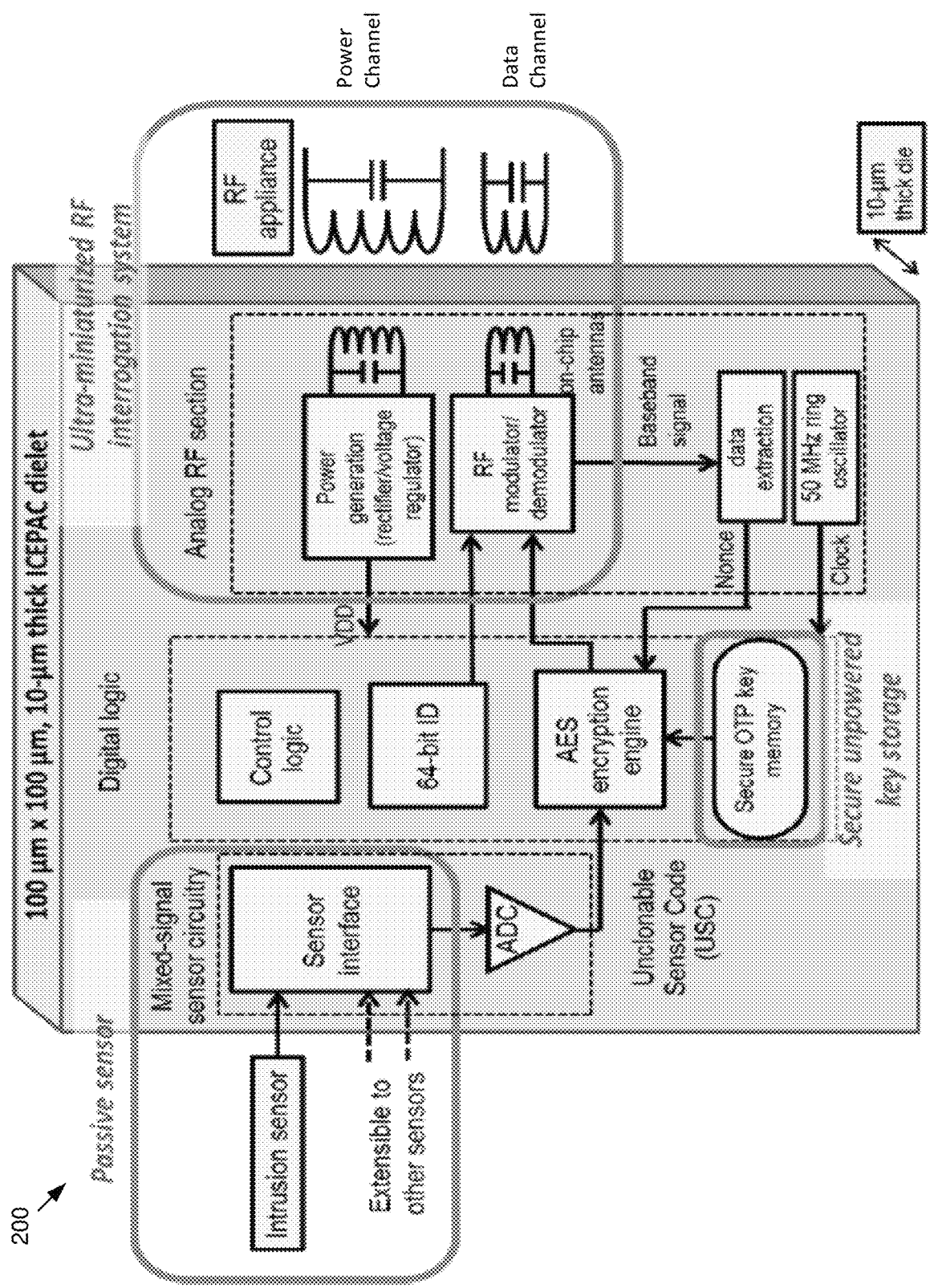
FIG. 2 illustrates a diagram of an embodiment of a configuration of an integrated circuit, in which a power receiver coil is attached to a power generation block.

FIG. 2 illustrates a diagram of an embodiment of a configuration of an integrated circuit, in which a power receiver coil is attached to a power generation block. A block diagram of a configuration of the integrated circuit 200 is illustrated in FIG. 2.

The integrated circuit has RF Identification components and circuitry. The RFID components and circuitry include two or more coils and corresponding electrical circuits that are tuned to use two or more different resonant frequencies. A first resonant RF is used for power generation. A second resonant RF is used for data communication.

In one embodiment, the integrated circuit can be a passive device that externally gets its operating power sent over by an associated RF reader through the first resonant RF for power generation. The power generation circuit on the integrated circuit includes a first RF resonant circuit, a rectifier, and voltage regulator to generate a supply voltage for electrical components on the integrated circuit. The first RF resonant circuit is configured to electrically couple with a companion power transmitter coil on the associated RF reader.

The RFID components and circuitry includes a RF power generation circuit and a separate RF data decoding circuit that both electronically couple via the two or more coils on the integrated circuit to one or more coils in an associated RF reader. The power generation circuit and the data input circuit are separate circuits with separate RF tunable coils fabricated into the integrated circuit. The power generation circuit has a first coil tuned in the first resonant RF range for the purposes of receiving power and a data decoding circuit that is tuned to the separate second resonant RF for data decoding that second resonant RF.

The modulator-demodulator circuit of the RF data circuit modulates the signal waves to decipher the data coming from the RF reader. The RF reader and the RF chip form a bidirectional communication channel between the RF modulator demodulator and corresponding circuits.

The first coil in the power generation circuit is a resonant circuit with a number of coils and capacitance tuned to the first RF. A second tunable coil in the RF data decoding circuit is also a resonant circuit with a number of coils and capacitance tuned to the second RF. At least one Gigahertz (GHz) difference exists between the first resonant RF and the second resonant RF. Typically, at least a 2 GHz difference exists in order to avoid both noise harmonics and crosstalk between the two tunable coils.

The tuned resonant circuits may use a high Q and are a narrowly focused bandpass filter. Thus, this concept uses two different frequencies, one frequency resonated at, for example, 3.6 GHz, the first frequency; and a second frequency resonated at, for example, 5.8 GHz, the second frequency. Each resonant circuit is tunable in its number of coils and capacitors to a specific RF resonant frequency. The resonant circuit will pass these frequencies relatively unattenuated over a specified RF band of frequencies. The resonant frequency can be achieved when the impedance of the inductor is equal to the impedance of the capacitor. (i.e. $f_0 = 1/(2\pi(L*C)^{1/-2})$ the resonant frequency is equal to one divided by 2 times 3.14 times the square root of the inductance of the coils times the capacitance of the capacitors.) At the resonant frequency, the resonant circuit couples and passes those RF frequencies close to the resonant frequency. Outside of the band being passed, the tuned resonant circuit acts as an electrical open circuits to these other frequencies.

Thus, in one configuration, the integrated circuit has two coils, one coil for the purposes of receiving power and the other coil for receiving and transmitting data. Having separate coils for power and data allows power to be continuously transmitted. This eliminates the need for large value capacitors on the integrated circuit that are typically used for modulating data directly on the power channel. In addition, the separate coils allow independent optimization of power and data channel coils and circuitry. Thus, data corruption may be minimized or eliminated and power may be continuously transmitted.

Again, one feature of the integrated circuit is that it may be a passive device. The electrical power needed to operate the integrated circuit may be supplied via inductive charging schemes. To accommodate this need, a power receiver coil is included within the structure of the integrated circuit along with a companion power transmitter coil on the reader. In FIG. 2, the power receiver coil is shown attached to the power generation block. A functional block of the RF reader that includes the companion power transmitter coil will be described further below. In addition to being electrically coupled to the power receiver coils, the power generation block may also rectify and regulate the power such that appropriate power is delivered to the electrical components of the integrated circuit. The RF reader and RF chip form a uni-directional channel between the RF reader sending power frequencies to be coupled through the resonant of the power generation, then through the rectifier and voltage regulator.

Next, the embedded memory on the integrated circuit may be an embedded read-only memory. One-time programming information of security content may be programmed into the embedded read-only memory. Note, the integrated circuit, after a singulation process from the wafer, may have no test pads or power pads geographically on the singulated integrated for probes of an external tester to connect to.

There is an increasing need to authenticate various objects through the supply chain such as but not limited to industrial and consumer goods. The need is not only to authenticate the objects as a whole but also to authenticate the components that make up the object, and to ensure that these components and objects are not replaced with counterfeit parts during routing through the manufacturing and distribution supply chain. As an example, there is a need to authenticate a circuit board at the integrated chip level. In addition, there is a need to make these authentication mechanisms small in size so that they may be integrated within the host object unobtrusively and without taking up sometimes valuable space that may be required to achieve the functional and other design requirements of the object. In yet another need, the authentication mechanisms may need to be designed such that once installed within a host body, physical or other attempts to replicate the authentication mechanism or its unique identifier may be detected.

In contrast to existing authentication mechanisms, the disclosed approach utilizes an electronic tag or "integrated circuit," of a small form factor such as but not limited to 100 μm×100 μm×10 μm. The small size and low cost of the tag allows for wide-spread adoption. The illustrative integrated circuit contains a full 256-bit encryption based on a secure nonvolatile key storage, has a unique identifier (ID), an unclonable intrusion sensor and an unclonable sensor code. The integrated circuit may be passive, with power/data transfer occurring by inductive-coupling through radio frequency (RF) energy when the integrated circuit is in the near-field of a reader device. The system includes a reader that includes mechanisms to transmit and receive radio-frequency (RF), to provide power and to achieve two-way data communication with the integrated circuit. The RF reader may also have other functions such as processing and communicating the data read back from the integrated circuit to a secure server and receiving a status back from the secure server. The server-to-integrated circuit communication can be implemented in a number of various challenge/response integrated circuit-server protocols. The status may contain information regarding the authenticity of the queried body.

The authenticity of the body to which the integrated circuit is coupled may be verified with low cost mechanisms. As the integrated circuits may be physically small, the size of the integrated circuit is less likely to interfere with design and functionality of the host body to which the integrated circuit is coupled. The technologies described in this disclosure may be applied across wide range of industrial and consumer verticals such as but not limited to military electronic equipment, industrial goods, every day consumer goods, luxury goods, pharmaceuticals, etc., to ensure the authenticity of these goods through the manufacture and distribution supply-chain.

The patent application WO 2016/133601, "Unclonable RFID chip and method," describes an RFID chip configured with an unclonable identification code. In particular, the WO 2016/133601 patent application describes an unclonable RFID chip that has dimensions that may be in the order of tens of microns. As used herein, the term "integrated circuit" may include a device or apparatus, such as a chip of the type described in the WO 2016/133601 application, and/or its various alternative configurations.

Process of Enrollment and Application of Integrated Circuits

The enrollment process in which a unique signature is associated to a host body, may have multiple steps. One or more pieces/aspects of unique information may be programmed into the integrated circuit. As the integrated circuit may be physically small in the order of tens of microns, a programming technique to accommodate the small size of the integrated circuit and for programming the integrated circuit is explained further below. An initial step of the enrollment process where a unique code is programmed into the integrated circuit and these codes are uploaded into a secure database, may occur for example at a factory where the integrated circuits are manufactured. After the codes are programmed and other manufacturing and productions steps are completed, these integrated circuits may then be shipped to another location where the integrated circuits are coupled to a host body whose authenticity needs to be determined at some later time. The next step in the enrollment process may occur at this second location. At this step, a second aspect of the unique code may be determined that is dependent on the local characteristics of the area where the sensor is being placed within.

The process of application of the integrated circuit to the host body may differ depending on the host body. FIG. 1 shows the integrated circuit coupled to an IC. In this particular example, the integrated circuit is placed in a small hole within the IC package. There are several ways an integrated circuit may be placed within the IC package. In one technique, the integrated circuit is placed on a layer of carbon-polymer composite material and then embedded within epoxy resin. In another technique, the carbon-loaded polymer composite is placed on the integrated circuit prior to insertion into the package. The carbon-polymer composite material enables the creation of an unclonable and unique signature formed by using the resistance values between the pads of the integrated circuit. Since the resistance between pads depends on the amount of carbon present in the composite between the pads (which may be a random quantity), a unique code is created. Thus, the resistance values are unique and are random in the sense that they vary as per the local composition of the composite. They are not random in that if the resistance values were to be read again at the same location, they would not vary beyond a predetermined amount. The predetermined amount may be set in various ways including but not limited to experimental data, simulation data or analysis data. The reader, in addition to reading the programmed code in the embedded memory, also reads the code formed by using the resistance values; these two pieces/aspects of information may then be sent to the server. In addition to these two pieces of unique information that are associated with the integrated circuit, a unique identifier that is associated with the host body that the integrated circuit is being coupled to, may also be read. The information from the integrated circuit and the host body it is being coupled to may thus be associated and sent to the server. The identifier associated with the host body maybe read by the same reader that is used for obtaining the information from the integrated circuits or alternatively, another reader such as but not limited to a bar code scanner may be used. Even further methods such as but not limited to manual entry of part numbers may also be utilized.

Design of the Integrated Circuit Including the Integrated Circuit Coils

The integrated circuit may be a silicon chip with dimensions in the order of tens of microns. In one configuration, the integrated circuit may be 100 μm×100 μm. The integrated circuits may be fabricated in a silicon foundry that may produce silicon wafers with transistors on their surface and depending on the technology used for fabrication, about ten layers of metal separated by layers of electrical insulator. These metal layers may be independently patterned into features such as wires and pads. In addition, vertical connections that may electrically connect features on adjacent layers, may be inserted. In the design of the integrated circuit, some common design rules may be applied. These rules influence, among other things, the thickness and composition of the metal layers, their vertical separation, the minimum lateral dimensions of the metal lines and their minimum lateral separation, and the size of vias and their minimum lateral separation.

Though the primary purpose of the metal layers is to connect the transistors into circuits, they may be used for other purposes. In the configuration of the integrated circuit illustrated in FIG. 3, three metal levels for the coils although more or fewer levels may be utilized. In this three metal layer configuration, the upper two metal levels may be used for the coils. The third level may be used to create a shield separating the two coil layers from the underlying silicon which contributes to microwave loss.

Figure 3:
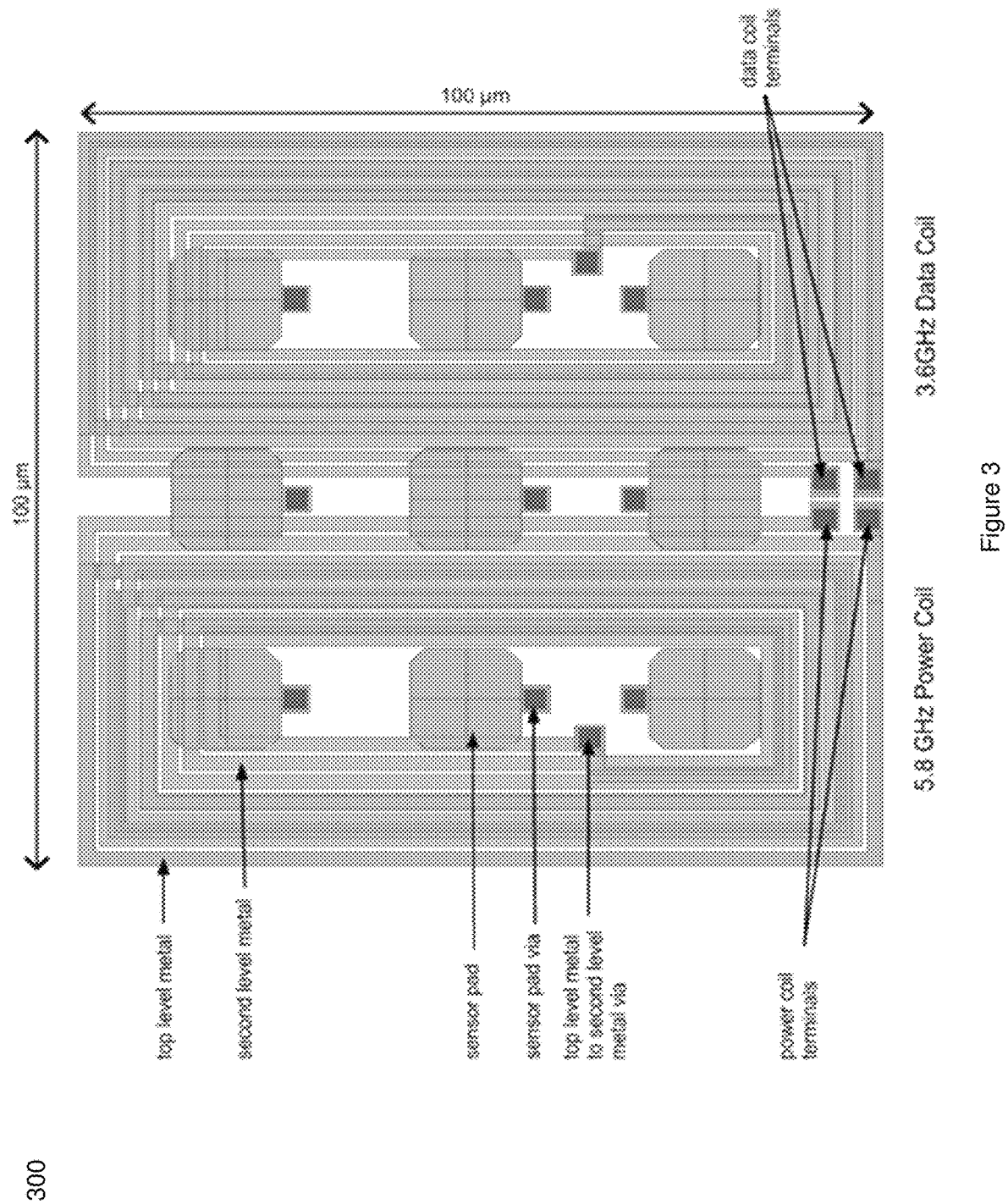
FIG. 3 illustrates a diagram of an embodiment of a configuration of an integrated circuit, in which coils in the integrated circuit are placed side-by-side.

FIG. 3 illustrates a diagram of an embodiment of a configuration of an integrated circuit, in which coils in the integrated circuit are placed side-by-side. FIG. 3 shows how the two separate coils each tuned to a separate resonant frequency are laid out on the silicon chip 300.

The side-by-side configuration can have advantages over concentric coils although the concentric coils approach is not excluded. In the concentric coil approach, the power coil may be made with one metal layer and a concentric data coil with the second metal layer. This configuration may result in electrical coupling between the two coils, increasing the difficulty of matching the impedance of the coils. Changing the matching network to one may adversely affect the matching of the other. Moreover, the signal intended for one coil may couple to both coils. Narrow bandpass filters at the operating frequency of each coil may reduce these disadvantages of the concentric coils however including such filters may lead to an increased size of the integrated circuit. Thus, to eliminate the coupling and to minimize the physical size of the integrated circuit, the side-by-side coils may be utilized. In one configuration, some overlap between the two coils may be allowed. The overlapping metal within each coil may give rise to a parasitic capacitance. However, the overlap may be adjusted so that the LC resonance may attain a value that has a negligible effect on the electrical operation of the integrated circuit. In one configuration the overlap caused the LC resonance to be at 9 GHz. As the example operating frequencies in this configuration were 3.6 GHz for data and 5.8 GHz for power, the LC resonance frequency was high enough frequency that it has a negligible effect on the integrated circuit.

An unclonable code may be created by placing the integrated circuit in a coating of carbon-loaded epoxy. This epoxy may be in electrical contact with multiple pads that may be part of the integrated circuit. The unique code may be formed using the resistance values between the pads. In one configuration, nine pads arranged in a 3×3 array may be used. The pads may be formed in multiple ways. In one example, the pads may be formed utilizing the top metal layer. The sensor pads are connected to the underlying electronics through vias formed through the layers.

Description of the Reader

Figure 4:
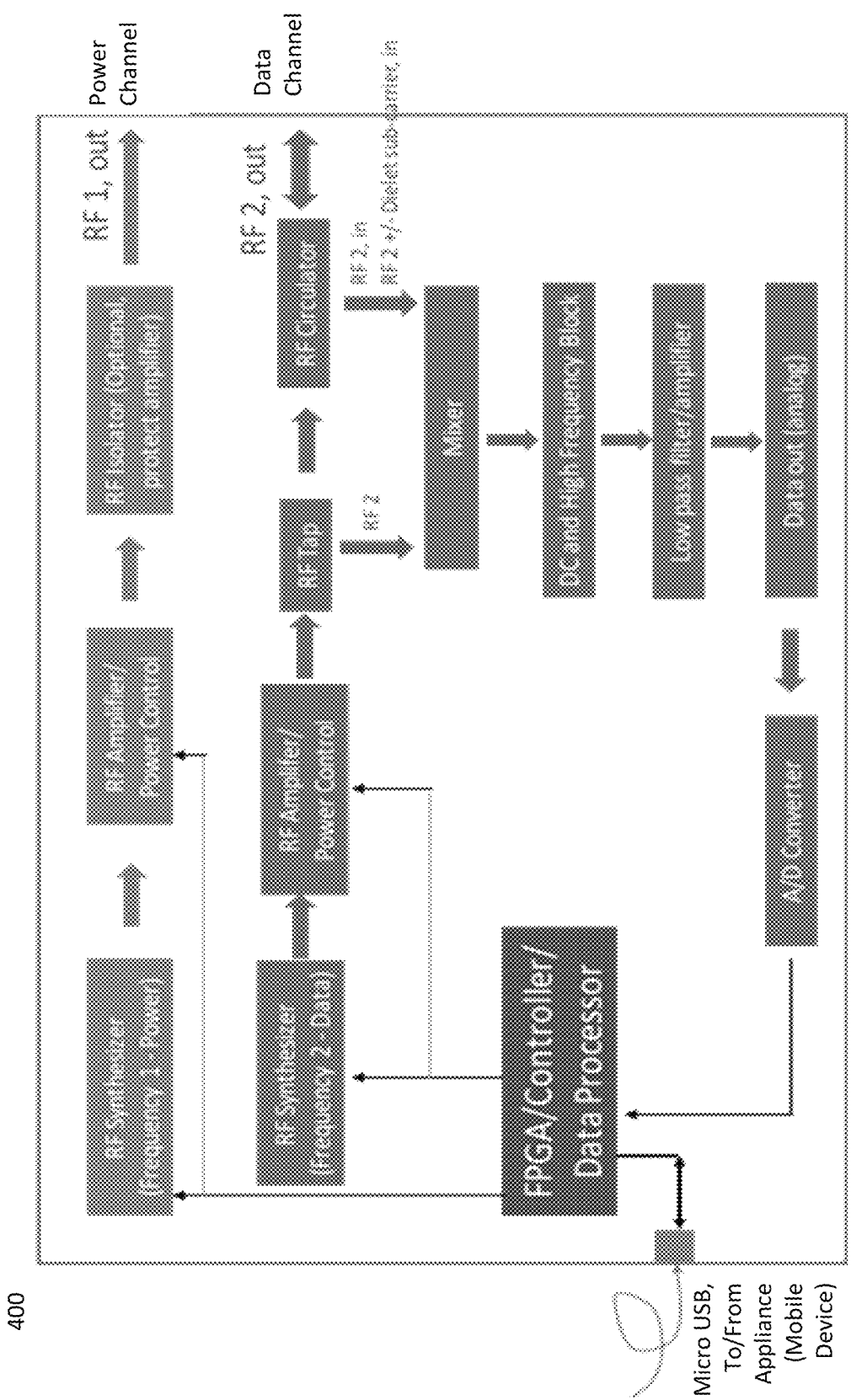
FIG. 4 illustrates a diagram of an embodiment of a RF reader.

FIG. 4 illustrates a diagram of an embodiment of a RF reader. A block diagram of a configuration of the RF reader 400 is illustrated in FIG. 4. As stated earlier, the RF reader may have two coils, one dedicated to transferring power (power channel) to the integrated circuit and the other dedicated to transmitting and receiving data to and from the integrated circuit (data channel). The operating frequencies of the two channels may be different, for example 5.8 GHz for the power channel and 3.6 GHz for the data channel. In FIG. 4, path RF1 illustrates the power channel and path RF2 illustrates the data channel. In FIG. 4, in the RF1 path, a synthesizer creates the signal at the appropriate frequency that is then amplified and filtered and fed to one coil. In the RF2 path, the same functional blocks as above may be utilized for transmitting data. Thus, this path may also have a synthesizer that creates a second signal at a second frequency (for the purposes of clarity, this frequency will be called the carrier frequency), that is then amplified and filtered and fed to a second coil. In one implementation, the integrated circuit data transmission operates by modulating a low-frequency sub-carrier (for example at 25 MHz). This on-off keyed sub-carrier is seen as a sideband on the receive RF2 carrier frequency. Demodulation is then utilized to recover the integrated circuit data from the modulated sub-carrier. For the receive functionality of the RF2 path, the second coil receives the data from the integrated circuit as a modulated sub-carrier and feeds it to a mixer. Within the mixer, the received signal is mixed with the carrier signal; this gives rise to a signal at DC, at base band and a signal at approximately twice the carrier frequency. This signal is then low pass filtered and fed to a log-amplifier. The resultant is the signal that contains the data from the integrated circuit. This signal may then be digitized, processed and may be sent to the appliance/server for server-side decryption and verification.

Arrangement of Coils in the Reader

The coils in the reader may be arranged in multiple configurations. These configurations may include but may not be limited to the two coils being concentric, overlapped, side-by-side or side-by-side but rotated 180° with respect to each other. The considerations to minimize or eliminate the cross-coupling between the two coils remain the same as for the integrated circuit however some additional considerations become relevant. In one additional consideration, the space constraints encountered within the reader may be relaxed. Thus, bigger coils may be used and more discrete components may be used to isolate the signals. However even though larger coils may be used, the two coils of the reader have to still inductively couple to two small coils in the integrated circuit. Thus the EM fields of the reader coils should be placed with this constraint. Because the area of the integrated circuit coil is so small, it is a challenge to get enough RF magnetic flux lines to generate power/data in the integrated circuit. The approaches described herein are designed to overcome this and other challenges.

An example of the placement of EM fields may be as follows. In an embodiment, the coil is arranged such that there is an asymmetry in the winding. The right side of the coil has effectively a larger winding due to the arrangement of the coil termination as it goes under the winding body. This creates an EM field that is not concentric with the axis of the coil. The region with the strongest EM field is offset from the axis of the coil. In an embodiment, two windings are placed side-by-side but they are effectively rotated 180° with respect to each other. The coil terminations of the two coils are rotated 180° with respect to each other. For example, if the coil on the left is the "driven" coil, the strongest region of the EM field is strongest to the right overlapping with the second coil. In an embodiment, if the coil on the right is the driven coil, then the strongest region of the EM field is to the left overlapping with the second coil. It can be seen that the two regions overlap to a large extent. With this configuration, both the integrated circuit coils may be coupled by the two coils on the reader, particularly if they are arranged within the overlapping regions of the two reader coils.

Figure 5:
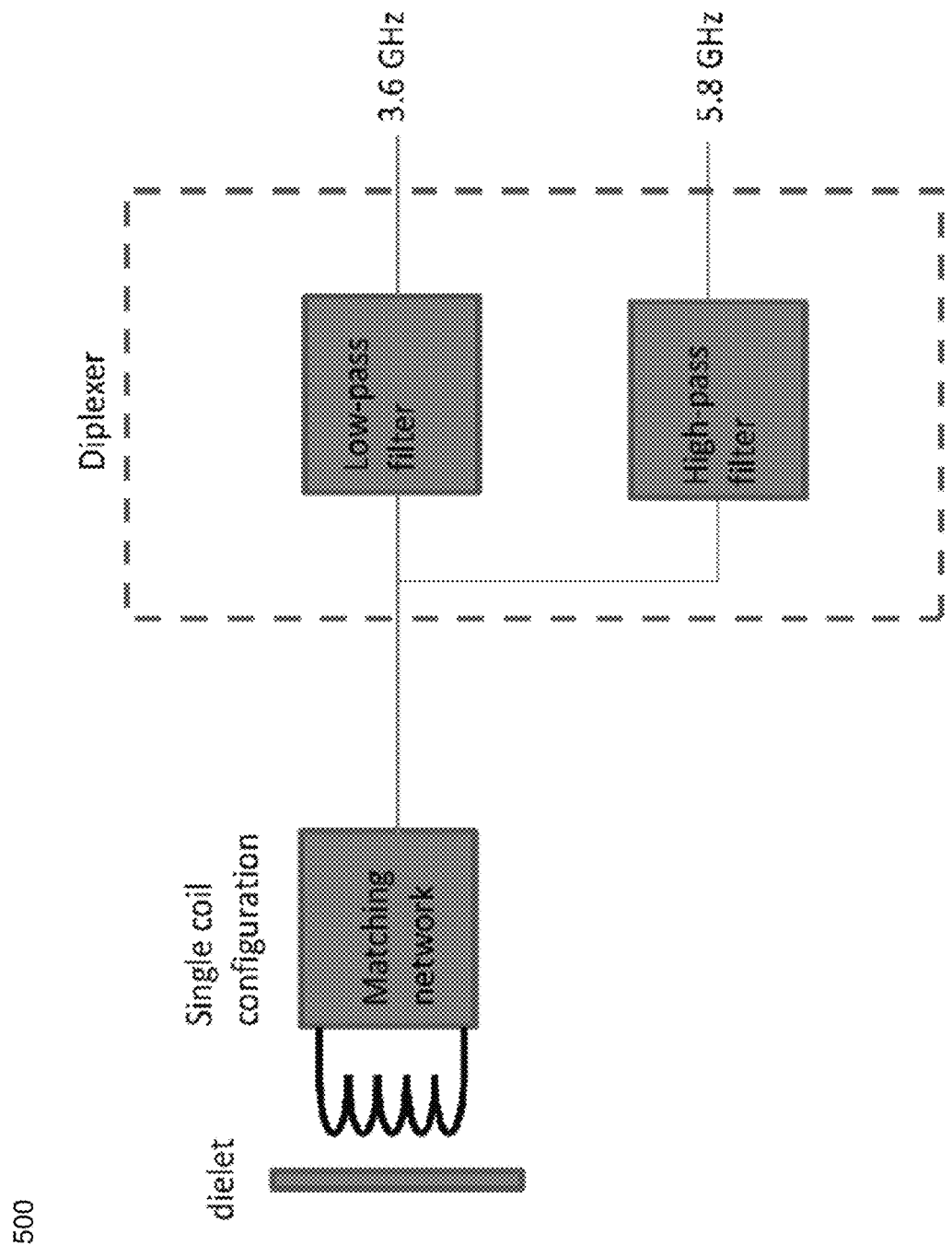
FIG. 5 illustrates a diagram of an embodiment of a simplified schematic diagram of a reader-side coil configuration.
Figure 6:
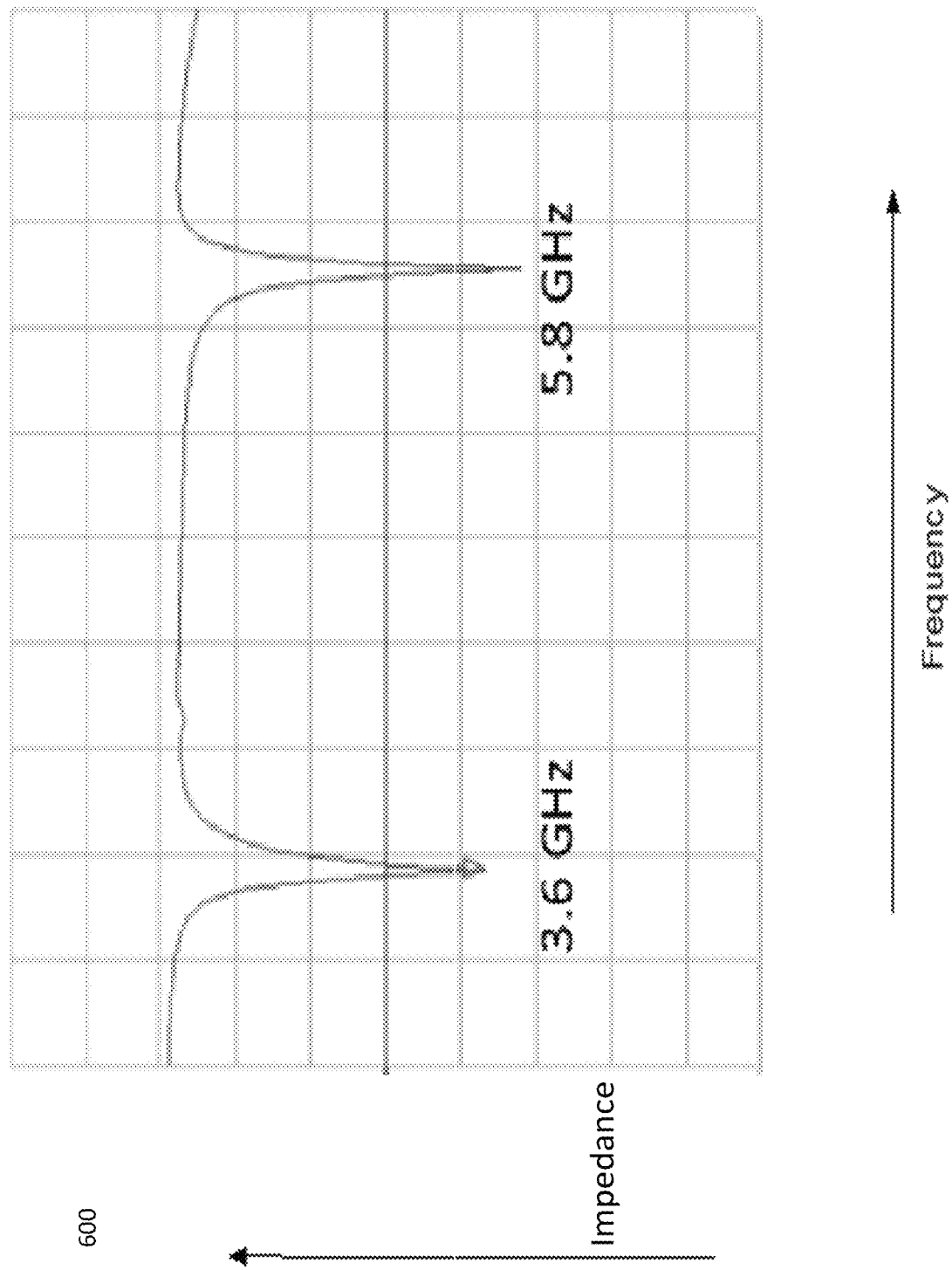
FIG. 6 illustrates a diagram of an embodiment of a simplified plot which illustrates impedance of a matching network of a coil configuration designed in accordance with FIG. 5.

FIG. 5 illustrates a diagram of an embodiment of a simplified schematic diagram 500 of a reader-side coil configuration. FIG. 6 illustrates a diagram of an embodiment of a simplified plot 600 which illustrates impedance of a matching network of a coil configuration designed in accordance with FIG. 5.

Another reader-side coil configuration is illustrated in FIG. 5. In this configuration, a single physical coil is utilized with a design for operation at two RF frequencies simultaneously. To accomplish this, the coil may be coupled to a matching circuit that allows resonance at the two desired frequencies. Thus, the matching network of FIG. 5 allows resonances of, for example, 3.6 GHz and 5.8 GHz. Additionally, the electronics coupled to the coils allow transmission of 5.8 GHz (i.e., power transmission channel) and transmission/reception at 3.6 GHz (i.e., "data" channel). FIG. 6 illustrates the impedance of this matching network. This figure shows that at 3.6 GHz and 5.8 GHz, the resonances may occur simultaneously.

The output of the reader board is the dual RF channels, nominally at 3.6 GHz and 5.8 GHz. In the configuration shown in FIGS. 5 and 6, these dual RF channels couple into a "diplexer," a device that couples this two-channel input into a single output. This diplexer includes a bank of filters such as a low-pass filter and a high-pass filter that combine the two RF inputs to a common output. The output of the diplexer inputs to the matching-network, which is designed to allow resonance and operation at these two RF frequencies. Upon data reception from integrated circuit-to-reader, the signal is fed back through the diplexer, separating the data channel from the power channel to the reader-board receiver, where the data is extracted as described elsewhere. The output of the matching network may then be fed into the bank of filters such as a low pass filter and a high pass filter so that the two signals may be separated and processed appropriately.

Thus, two separate circuits are used on the integrated circuit. However, on the cooperating RF Reader, the reader may use a single inductive coil configuration or a two separate inductive coil configuration. In the two separate inductive coils configuration, each resonant circuit has its own separate resonant frequency. Thus, both circuits being tuned to a different resonant frequency.

Active Feedback to the Reader Board

A potential protocol for the initial reader-integrated circuit "handshake" is that upon power up, the integrated circuit proceeds to send back to the reader a series or sub-carrier bursts. These are not intended to contain any information about the integrated circuit's unique codes or encrypted data, but to calibrate the reader to the integrated circuits sub-carrier frequency. The integrated circuit contains a clock, typically a ring-oscillator, and due to size and power constraints, this oscillator cannot be made a precisely-fixed frequency. In other words, its oscillation frequency will change depending on the power-on voltage level.

The reader than may read back this set of sub-carrier pulses, digitize the waveform and using the on-reader-board processor (e.g., a field programmable gate array (FPGA) or equivalent), process this data to determine the temporal duration of these return pulses. The reader board then has several options, depending on the configurations. Knowing the return pulse durations, the reader may redefine, in software, what temporal duration constitutes a "0" bit and what constitutes a "1" bit (under the assumption that the data transfer protocol is based on ASK pulse-width-modulated waveforms). In this regard, there is no active control to the RF portion of the reader board, just to the firmware which is deciding the temporal thresholds for a "0" or "1" bit. Alternatively, the reader board may use this initial return pulse duration to adjust the RF channels powers to adjust the return-pulse-durations to a width within tolerable range of the intended pulse duration (meaning shifting the ring-oscillator frequency into a tolerable range of its intended frequency).

In either case, the reader/integrated circuit can continue to receive and process these sub-carrier pulses until the system is set within acceptable tolerances and then the reader can instruct the integrated circuit to begin the challenge/response protocol.

Figure 7:
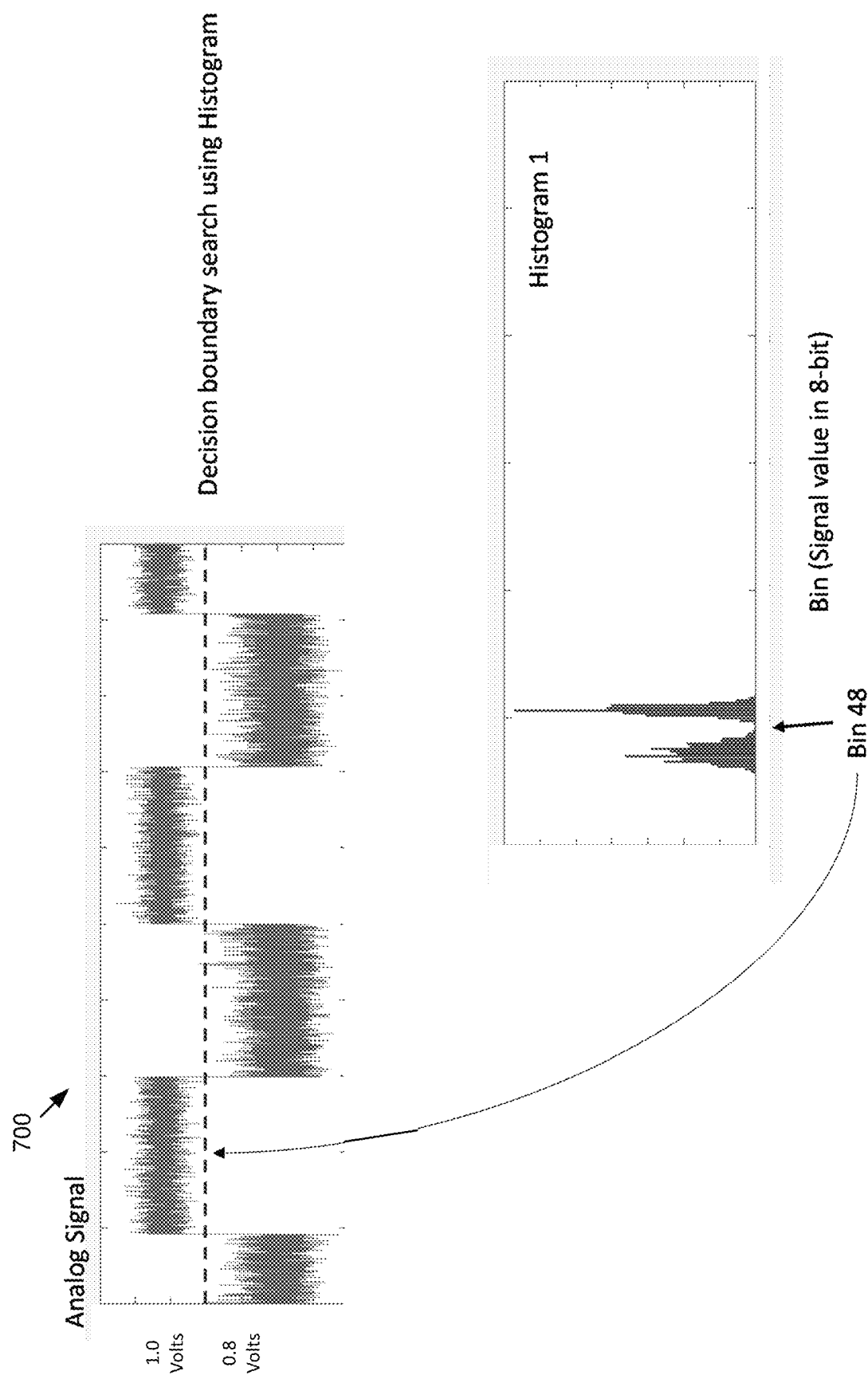
FIG. 7 illustrates a diagram an embodiment of a test consisting of a challenge-response protocol exchange, including a modulated chirp, between an external RF reader board and the fabricated and singulated integrated circuit being applied.

FIG. 7 illustrates a diagram an embodiment of a test 700 consisting of a challenge-response protocol exchange, including a modulated chirp, between an external RF reader board and the fabricated and singulated integrated circuit being applied. FIG. 8 illustrates a diagram 800 of the external RF reader sampling the one or more modulated chirps and applying statistical analysis to the sampled data to determine what constitutes a logical 1 and a logical 0 from the fabricated and singulated integrated circuit.

A final test after singulation can be as follows. After singulation, a test consisting of a challenge-response protocol exchange, including a modulated chirp, between a RF circuit of an external RF reader and the fabricated and singulated integrated circuit is applied. The protocol exchange, including the modulated chirp exchange, allows the RF reader to interpret sampled data of an average pulse width and average voltage amplitude level of the response from the integrated circuit to determine the integrated circuit's actual measured operating frequency and operating voltage levels. The external RF reader then adapts the modulation rate of challenge-response data communication to match the integrated circuit's actual measured operating frequency and operating voltage levels to determine what constitutes a logical 1 and a logical 0 from the fabricated and singulated integrated circuit.

In an example embodiment, the RF circuit of the external RF reader sends power wirelessly to the singulated integrated circuit to be coupled by the inductive-capacitive circuit of the integrated circuit to receive its operational power during its operation. The integrated circuit then sends out a series of at least one or more modulated chirps as well as other types of responses in response to being initially being powered on for the first time.

The external reader to integrated circuit communication channel is designed to operate at a fixed-frequency. However, there are practical issues influencing the actual frequency of the integrated circuit's master clock (e.g. a ring oscillator). Some issues include the clock oscillations are affected by voltage and temperature variations of a particular integrated circuit. The operating voltage level for the integrated circuit is a function of RF power-level and coupling efficiency into the integrated circuit's power supply. Temperature can be controlled and measured.

The integrated circuit is configured to send out an initial chirp modulated at fixed frequency to provide indication that the integrated circuit is receiving adequate power to operate. In addition, each pulse modulation in the duration of chirp and/or response gives an opportunity to measure integrated circuit's actual operating frequency. The modulating chirp from the integrated circuit will be an alternating logical '0'/'1' data pattern. All of the measurements may be supplied to a data detection module. Once the signal is sliced (post determining the decision boundary), pulse off times are sampled and a histogram approach is used to find the best separation between a received '0' and '1' data pulse.

The external RF reader knows what the modulation rate of challenge-response data should be. The external RF reader board samples the one or more modulated chirps, applies statistical analysis to the numerous samples to determine pulse width intervals of each sampled response and correlates that to the current clock frequency of the integrated circuit. The average time interval of a modulated pulse sent out to the external reader can be mathematically correlated back to the current clock frequency. In an embodiment, measuring the time period of a low-frequency square-wave from the integrated circuit in the external RF reader can provide a quick and accurate measurement of the integrated circuit's ring oscillator actual frequency. The external RF reader's digital electronics (e.g. FPGA) that measures the actual integrated circuit frequency and then adapts the data pulse-widths to match.

Similarly, with the voltage amplitude measurements, the Reader's digital electronics (e.g. FPGA) that measures the actual voltage level and then adapts the logical 1 and logical 0 reference voltages to match. The Reader samples all of the response pulses in modulated chirp from the integrated circuit and uses statistical analysis of numerous samples, such as a histogram, to determine an average voltage level for a logical 1 response and an average voltage level for a logical 0 response.

Note, the protocol exchange can vary known/expected clock rate and vary the expected voltage amplitude to get back better sampled data and use binning to get averages of pulse widths durations.

Overall, the purpose is to adapt the DC voltage level (indicating a high and a low) from the demodulator to determine the best separation boundary, and to the chirp frequency to then infer the integrated circuit frequency. The calculated integrated circuit frequency is used to determine the correct TX (reader board->integrated circuit) data pulse widths (for the challenge packet). This method will improve integrated circuit response SNR and therefore reduce the number of failed integrated circuit responses.

Alignment

In some configurations, techniques to align the reader coils and the integrated circuit coils may be provided. Various techniques to provide alignment such as but not limited to mechanically based techniques, or electronic based techniques, may be provided. In one technique a mechanical feature such as but not limited to a protrusion (or depression) may be provided within the structure of the hole of the host body. This protrusion may match a depression (or protrusion) on the reader head—this allows the reader head to be placed within the hole thus aiding in alignment of the coils. Other techniques may involve having the reader produce an audible noise or a visual cue (such as lighting up a light emitting diode) when alignment has been reached as determined by the strength or the frequency of the signals coming back from the integrated circuit.

Application Features

In some configurations, the reader may be communicatively coupled (e.g., connected by wired, wireless, or optical technologies) to a device such as but not limited to a smart phone. The smart phone may have an application that communicates to the reader. The smart phone may also have a user interface that guides users through the various tasks associated with using this system such as but not limited to the enrollment process and the verification process when the authenticity of a host body is to be verified. In addition to communicating to the reader, the device may also communicate to a secure server to send and receive information to and from this server. This communication may occur in real time or may happen as and when desired. As an example, in some configurations, the device may not be able to communicate to the server immediately while querying a host body or integrated circuits to verify the authenticity. In this case, the unique codes and identifiers of the host body or integrated circuits may be stored within the device and at a later time, the communication between the device and the server may take place. In this case, the confirmation of the authenticity may not occur immediately.

Use of Multiple Integrated Circuits

In some configurations one or multiple integrated circuits may be used within a single host component. Examples of host components may include but may not be limited to one or multiple circuit boards where each circuit board uses one or multiple integrated circuits, or consumer devices such as a smartphones or industrial goods such as airplanes or luxury goods etc. In these cases, the one or multiple integrated circuits may be queried; thus the host component may be queried as one body or the various subcomponents within the host component may be queried individually. In some cases when using multiple integrated circuits in a single host component, a unique identifier may be created using the codes of the multiple integrated circuits.

Illustrative examples of the technologies disclosed herein are provided below. An embodiment of the technologies may include any one or more, and any combination of, the examples described below.

In an example 1, an authentication system includes one or more integrated circuits and a reader, where the reader and/or the integrated circuit comprises a mechanism to communicate wirelessly (e.g., inductively) between the reader and the integrated circuit.

In an example 2, at least one of the integrated circuits of any of the examples has a small form factor such as but not limited to 100 μm×100 μm.

In an example 3, at least one of the integrated circuits of any of the examples includes an unclonable identifier that uniquely identifies the integrated circuit.

In an example 4, the integrated circuit(s) any of the examples are coupled to a host body, such as a consumer device, an industrial device, or a component of a device.

In an example 5, the reader of any of the examples includes at least two coils, where at least a portion of one of the coils spatially overlaps a portion of the other coil in three dimensional space.

In an example 6, the system of any of the examples includes a reader that has only a single coil, where the reader-side coil is configured to resonate at two different frequencies, and where a matching network may be used to cause the reader-side coil to resonate at two different frequencies.

In an example 7, the communication mechanism of the reader to communicate with the integrated circuit of any of the examples is configured with active feedback control, where the active feedback control can be used to selectively adjust or adapt one or more settings (e.g., i) frequency related settings or ii) RF-power related settings) used to enable communication between the reader and the integrated circuit.

In an example 8, the reader of any of the examples is communicatively coupled to an electronic device, such as a smart phone, where the electronic device is configured with an application to manage enrollment and/or authentication processes.

In an example 9, the system of any of the examples comprises coil(s) coupled to the reader and coil(s) coupled to the integrated circuit, where the coil(s) of the reader are arranged to focus the electromagnetic (e.g. RF) field, operating in the near-field, to target area(s) on the integrated circuit. In some versions of the system, the distance from the reader to integrated circuit is much smaller than a wavelength of the RF used, so that a magnetic flux is created between the reader coil and the integrated circuit coil. In these versions of the system, the term "focus" as used above may refer to a coil arrangement that is configured to maximize the magnetic flux coupling between the reader and the integrated circuit, and in particular the flux that propagates perpendicular to the plane of the coils.

FIG. 9 illustrates an embodiment of one or more computing devices 900 that can be a part of the systems associated with the integrated circuit discussed herein. The computing device may include one or more processors or processing units 920 to execute instructions, one or more memories 930-932 to store information, one or more data input components 960-963 to receive data input from a user of the computing device 900, one or more modules that include the management module, a network interface communication circuit 970 to establish a communication link to communicate with other computing devices external to the computing device, one or more sensors where an output from the sensors is used for sensing a specific triggering condition and then correspondingly generating one or more preprogrammed actions, a display screen 991 to display at least some of the information stored in the one or more memories 930-932 and other components. Note, portions of this system that are implemented in software 944, 945, 946 may be stored in the one or more memories 930-932 and are executed by the one or more processors 920.

The system memory 930 includes computer storage media in the form of volatile and/or nonvolatile memory such as read-only memory (ROM) 931 and random access memory (RAM) 932. These computing machine-readable media can be any available media that can be accessed by computing system 900. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 900. Transitory media such as wireless channels are not included in the machine-readable media. Communication media typically embody computer readable instructions, data structures, other executable software, or other transport mechanism and includes any information delivery media.

The system further includes a basic input/output system 933 (BIOS) containing the basic routines that help to transfer information between elements within the computing system 900, such as during start-up, is typically stored in ROM 931. RAM 932 typically contains data and/or software that are immediately accessible to and/or presently being operated on by the processing unit 920. By way of example, and not limitation, the RAM 932 can include a portion of the operating system 934, application programs 935, other executable software 936, and program data 937.

The computing system 900 can also include other removable/non-removable volatile/nonvolatile computer storage media. By way of example only, the system has a solid-state memory 941. The solid-state memory 941 is typically connected to the system bus 921 through a non-removable memory interface such as interface 940, and USB drive 951 is typically connected to the system bus 921 by a removable memory interface, such as interface 950.

A user may enter commands and information into the computing system 900 through input devices such as a keyboard, touchscreen, or software or hardware input buttons 962, a microphone 963, a pointing device and/or scrolling input component, such as a mouse, trackball or touch pad. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 900 can operate in a networked environment using logical connections to one or more remote computers/client devices, such as a remote computing system 980. The remote computing system 980 can a personal computer, a mobile computing device, a server, a router, a network PC, a peer device or other common network node, and typically includes many or all of the elements described above relative to the computing system 900. The logical connections can include a personal area network (PAN) 972 (e.g., Bluetooth®), a local area network (LAN) 971 (e.g., Wi-Fi), and a wide area network (WAN) 973 (e.g., cellular network), but may also include other networks such as a personal area network (e.g., Bluetooth®). Such networking environments are commonplace in offices, enterprise-wide computer networks, intranets and the Internet. A browser application may be resonant on the computing device and stored in the memory.

When used in a LAN networking environment, the computing system 900 is connected to the LAN 971 through a network interface 970, which can be, for example, a Bluetooth® or Wi-Fi adapter. When used in a WAN networking environment (e.g., Internet), the computing system 900 typically includes some means for establishing communications over the WAN 973. With respect to mobile telecommunication technologies, for example, a radio interface, which can be internal or external, can be connected to the system bus 921 via the network interface 970, or other appropriate mechanism. In a networked environment, other software depicted relative to the computing system 900, or portions thereof, may be stored in the remote memory storage device. By way of example, and not limitation, the system has remote application programs 985 as residing on remote computing device 980. It will be appreciated that the network connections shown are examples and other means of establishing a communications link between the computing devices that may be used.

As discussed, the computing system 900 can include mobile devices with a processing unit 920, a memory (e.g., ROM 931, RAM 932, etc.), a built in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to shown herein. However, the present design can be carried out on a server, a computing device devoted to message handling, or on a distributed system in which different portions of the present design are carried out on different parts of the distributed computing system.

In some embodiments, software used to facilitate algorithms discussed herein can be embedded onto a non-transitory machine-readable medium. A machine-readable medium includes any mechanism that stores information in a form readable by a machine (e.g., a computer). For example, a non-transitory machine-readable medium can include read-only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, HTTP, Java, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both. Any portions of an algorithm implemented in software can be stored in an executable format in portion of a memory and is executed by one or more processors.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. Thus, provided herein are one or more non-transitory machine-readable medium configured to store instructions and data that when executed by one or more processors on the computing device of the foregoing system, causes the computing device to perform the operations outlined as described herein.

References in the specification to "an embodiment," "an example", etc., indicate that the embodiment or example described may include a particular feature, structure, or characteristic, but every embodiment may not necessarily include the particular feature, structure, or characteristic. Such phrases can be not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
an integrated circuit having Radio Frequency Identification components and circuitry for authentication, where the RFID components and circuitry include two or more coils and corresponding electrical circuits that are tuned to use two or more different resonant frequencies including 1) a first resonant RF used for power generation and 2) a second resonant RF used for data communication, where the integrated circuit contains a unique signature that is used for the authentication, where the unique signature has two or more aspects including i) a first aspect that is a programmed password in a memory embedded on the integrated circuit, and ii) a second aspect that is a unique, randomly generated code based upon a physical characteristic of the integrated circuit, where the unique randomly generated code based upon the physical characteristic of the integrated circuit is an amount of resistance between pads for a sensor that depends on an amount of carbon present in a composite between the pads for that particular integrated circuit.

2. The apparatus of claim 1, where the integrated circuit is a passive device that is configured to externally receive operating power sent over by an associated RF reader through the first resonant RF used for power generation, where the operating power is received by a power generation circuit on the integrated circuit, the power generation circuit that includes a first RF resonant circuit, a rectifier, and voltage regulator to generate a supply voltage for electrical components on the integrated circuit, where the first RF resonant circuit is configured to electrically couple with a companion power transmitter coil on the associated RF reader.

3. The apparatus of claim 1, where the RFID components and circuitry include a RF power generation circuit and a separate RF data decoding circuit, that both electronically couple via the two or more coils on the integrated circuit to one or more coils in an associated RF reader, where the RF power generation circuit and the data input circuit are separate circuits with separate RF tunable coils fabricated into the integrated circuit, where the power generation circuit has a first coil tuned in the first resonant RF range for the purposes of receiving power as well as a data decoding circuit that is tuned to the separate second resonant RF and configured to perform a data decoding process on that second resonant RF.

4. The apparatus of claim 3, where the first coil in the power generation circuit is a resonant circuit with a number of coils and capacitance tuned to the first resonant RF, where a second tunable coils in the RF data decoding circuit is also a resonant circuit with a number of coils and capacitance tuned to the second resonant RF, where at least one GHz difference exists between the first resonant RF and the second resonant RF.

5. The apparatus of claim 1, where the two or more coils and corresponding electrical circuits that are tuned to use two different resonant frequencies electrically couple to a single inductive coil configured for the two separate different resonant frequencies located on an associated RF reader, where the single inductive coil configuration is tuned to two separate RF resonant frequencies.

6. The apparatus of claim 1, where the integrated circuit is an electronic RFID tag that is configured to physically couple with a separate product, where the electronic RFID tag is suitable for authenticating a provenance of the physically coupled separate product, via communicating to an associated RF reader, via the electronic circuitry using the second resonant RF for data communication and the first resonant RF for supplying power to the RFID tag, where the unique signature of the RFID tag is verified via a database of unique signatures.

7. A method of creating an authentication apparatus, comprising:
fabricating an integrated circuit having Radio Frequency Identification components and circuitry for authentication, where the RFID components and circuitry include two or more coils and corresponding electrical circuits that are tuned to use two or more different resonant frequencies including 1) a first resonant RF used for power generation and 2) a second resonant RF used for data communication, where the integrated circuit contains a unique signature that is used for the authentication, where the unique signature has two or more aspects including i) a first aspect that is a programmed password in a memory embedded on the integrated circuit, and ii) a second aspect that is a unique, randomly generated code based upon a physical characteristic of the integrated circuit, where the unique randomly generated code based upon the physical characteristic of the integrated circuit is an amount of resistance between pads for a sensor that depends on an amount of carbon present in a composite between the pads for that particular integrated circuit.

8. An apparatus, comprising:
an integrated circuit having Radio Frequency Identification components and circuitry for authentication, where the RFID components and circuitry include two or more coils and corresponding electrical circuits that are tuned to use two or more different resonant frequencies including 1) a first resonant RF used for power generation and 2) a second resonant RF used for data communication, where the integrated circuit contains a unique signature that is used for the authentication, where a sensor is configured to measure a physical characteristic of the integrated circuit, where a resonant circuit on the integrated circuit is tuned to use the second resonant RF for data communication to convey at least some of the unique signature's information to a first coil of an associated RF reader, where the associated RF reader is configured to i) read a programmed code in a memory and ii) read a unique randomly generated code based upon the physical characteristic of the integrated circuit, and these two aspects i) and ii) of the unique signature are then configured to be sent over a network to a server and associated database of unique signatures for different integrated circuits in order to verify an authenticity for the unique signature,
where the physical characteristic is an amount of resistance between pads for the sensor,
where the security server is configured to use a fuzzy logic algorithm to initially register a value indicative of the amount of resistance for each different integrated circuit, and
where the fuzzy logic algorithm has a range of acceptable values that will match the signature of that integrated circuit and will also take into account and allow for a change in the amount of resistance of that integrated circuit over time; and thus, a change in the second aspect ii) of the unique signature.

9. A method of creating an authentication apparatus, comprising:
fabricating an integrated circuit having Radio Frequency Identification components and circuitry for authentication, where the RFID components and circuitry include two or more coils and corresponding electrical circuits that are tuned to use two or more different resonant frequencies including 1) a first resonant RF used for power generation and 2) a second resonant RF used for data communication, where the integrated circuit contains a unique signature that is used for the authentication, where a sensor is configured to measure a physical characteristic of the integrated circuit, where a resonant circuit on the integrated circuit is tuned to use the second resonant RF for data communication to convey at least some of the unique signature's information to a first coil of an associated RF reader, where an associated RF reader, where the associated RF reader, in addition to i) reading a programmed code in a memory, also ii) reads a unique randomly generated code based upon the physical characteristic of the integrated circuit, and these two aspects i) and ii) of the unique signature are then configured to be sent over a network to a server and associated database of unique signatures for different integrated circuits in order to verify an authenticity for the unique signature where the physical characteristic is an amount of resistance between pads for the sensor, and where the security server is configured to use a fuzzy logic algorithm to initially register a value indicative of the amount of resistance for each different integrated circuit, where the fuzzy logic algorithm has a range of acceptable values that will match the signature of that integrated circuit and will also take into account and allow for a change in the amount of resistance of that integrated circuit over time; and thus, a change in the second aspect ii) of the unique signature.

10. A method of creating an authentication apparatus, comprising:
fabricating an integrated circuit having Radio Frequency Identification components and circuitry for authentication, where the RFID components and circuitry include two or more coils and corresponding electrical circuits that are tuned to use two or more different resonant frequencies including 1) a first resonant RF used for power generation and 2) a second resonant RF used for data communication, where the integrated circuit contains a unique signature that is used for the authentication, and
applying a test consisting of a challenge-response protocol exchange, including a modulated chirp, between a Radio Frequency circuit of an external RF reader and a fabricated and singulated integrated circuit after a singulation operation occurs, where a protocol exchange, including the modulated chirp exchange, allows the external RF reader to interpret sampled data of an average pulse width and average voltage amplitude level of a response from the integrated circuit to determine the integrated circuit's actual measured operating frequency and operating voltage levels.

11. The method of claim 10, further comprising:
fabricating the integrated circuit without a battery located or connected to the integrated circuit, where the integrated circuit is a passive device that externally receives operating power sent over by the external RF reader through the first resonant RF used for power generation, the operating power received by a power generation circuit on the integrated circuit, the power generation circuit that includes a first RF resonant circuit, a rectifier, and voltage regulator to generate a supply voltage for electrical components on the integrated circuit, where the first RF resonant circuit is configured to electrically couple with a companion power transmitter coil on the external RF reader.

12. The method of claim 10, further comprising:
fabricating the RFID components and circuitry to include two or more coils and corresponding electrical circuits that are tuned include a RF power generation circuit and separate RF data decoding circuit that both electronically couple via the two or more coils on the integrated circuit to one or more coils in the external RF reader, where the power generation circuit and the data input circuit are separate circuits with separate RF tunable coils fabricated into the integrated circuit, where the power generation circuit has a first coil tuned in the first resonant RF range for the purposes of receiving power as well as a data decoding circuit that is tuned to the separate second resonant RF and configured to perform a data decoding process on that second resonant RF.

13. The method of claim 12, further comprising:
fabricating the first coil in the power generation circuit with a resonant circuit with a number of coils and capacitance tuned to the first resonant RF, where a second tunable coil in the RF data decoding circuit is also a resonant circuit with a number of coils and capacitance tuned to the second resonant RF, where at least one GHz difference exists between the first resonant RF and the second resonant RF.

14. The method of claim 10, further comprising:
fabricating the two or more coils and corresponding electrical circuits that are tuned to use two different resonant frequencies to electrically couple to a single inductive coil configured for the two separate different resonant frequencies located on the external RF reader, where the single inductive coil configuration is tuned to two separate RF resonant frequencies.

15. The method of claim 10, where the unique signature has two or more aspects including i) a first aspect that is a programmed password in a memory embedded on the integrated circuit, and ii) a second aspect that is a unique, randomly generated code based upon a physical characteristic of the integrated circuit.

* * * * *